J. PALAS.
SHARPENING DEVICE FOR LAWN MOWERS.
APPLICATION FILED SEPT. 25, 1919.
1,359,192.
Patented Nov. 16, 1920.
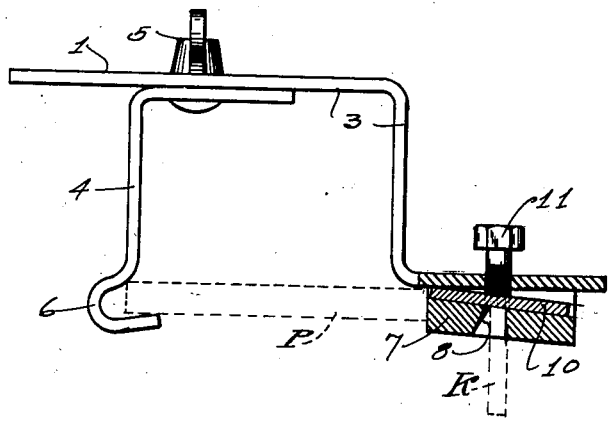
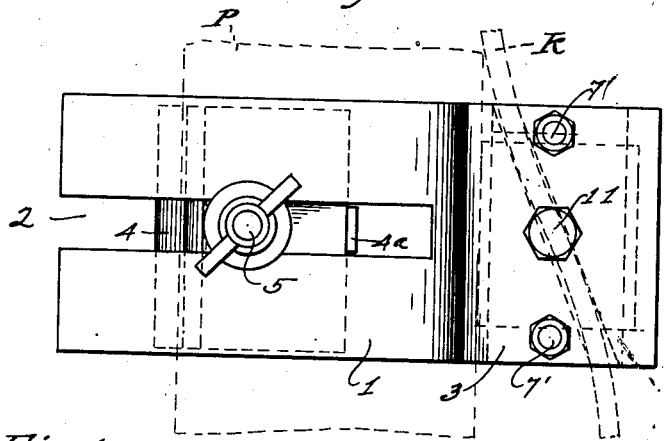
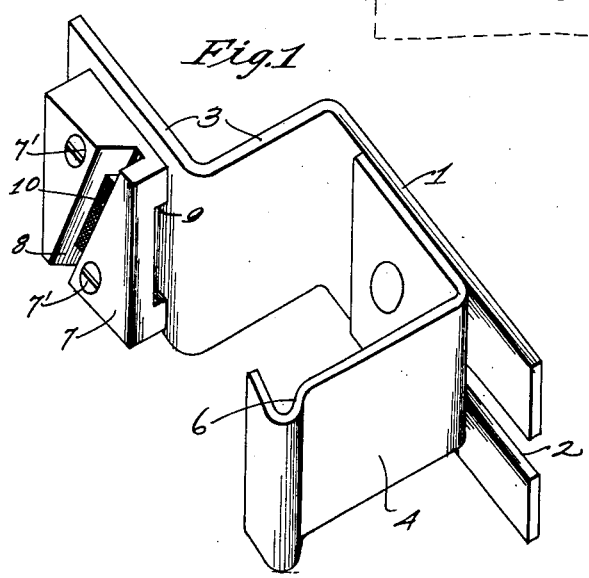
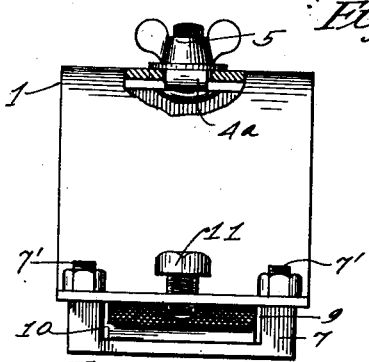
INVENTOR:
Josef Palas,

UNITED STATES PATENT OFFICE.

JOSEF PALAS, OF LOS ANGELES, CALIFORNIA.

SHARPENING DEVICE FOR LAWN-MOWERS.

1,359,192.     Specification of Letters Patent.     Patented Nov. 16, 1920.

Application filed September 25, 1919. Serial No. 328,613.

*To all whom it may concern:*

Be it known that I, JOSEF PALAS, a citizen of the United States, residing in the city of Los Angeles, county of Los Angeles, and State of California, have invented certain new and useful Improvements in Sharpening Devices for Lawn-Mowers, of which the following is a specification.

My invention relates particularly to a simple, practical and inexpensive device which can be manually operated on a lawn mower for the purpose of sharpening the blades thereof. One of the principal objects of my invention is to provide a device of the character referred to which can be quickly applied to a lawn mower, to be moved back and forth across the same by hand, with a part of the lawn mower constituting a guide for the movements of the device.

Another object of my invention is to provide such a device which can be readily adjusted to and used on most of the lawn mowers in use, regardless of their size and whether hand operated or power operated.

In order to describe my invention, I have illustrated on the accompanying sheet of drawings one practical form thereof which I will now describe.

Figure 1 is a perspective view of my invention as shown for illustrative purposes;

Fig. 2 is a top plan view thereof, with one of the revolving knives and the cutting plate of a lawn mower shown in light dotted lines;

Fig. 3 is an end view of the device; and

Fig. 4 is a side view thereof with the cutting plate and the cutting knife of a lawn mower indicated in dotted lines.

Referring now more in detail to the drawings, my invention as here illustrated, comprises a body member 1, provided with a slot 2, and bent down to form an angle portion 3. A guide member 4, is adjustably attached to the body member 1, by means of a bolt and thumb nut 5. Said guide member is provided at its lower end with a bent portion 6, adapted to be hooked around the edge of the cutting plate P, of a lawn mower, as indicated in Fig. 4, and to slide thereon as the device is moved lengthwise of said cutting plate P by hand. Said guide member is provided with a turned up tongue portion 4ª, adapted to the slot 2 in the body member 1, for holding said guide member in proper position relative to the body member 1.

Mounted on the under side of the angle portion 3 of the body member 1, is a holding and guiding member 7, detachably secured in place by means of screws 7', 7', said member 7, being provided with a guiding groove 8, therein, arranged diagonally thereof, as shown. This member 7 is preferably made of aluminum. Between said member 7 and the angle portion of the body 1, is provided a recess or socket 9, adapted to receive a piece of file, 10, or other suitable sharpening member, the same being held in place by means of a set screw 11, as indicated.

The guiding groove 8, in the member 7, is adapted to receive the cutting knife, K, of a lawn mower, that is, one of the revolving blades, the edge of which rests against the file or sharpening member 10. As it is preferable that the edge of the cutting blade be somewhat beveled, said member 7, it will be noticed, is so held that the file or sharpening member 10 will be at a slight angle across the edge of the blade.

In the use of my improved device, it is applied to the cutting plate, P, of a lawn mower, which for the time is turned upside down. After being properly adjusted, according to the width of the cutting plate, and with one of the cutting knives positioned in the groove 8 and against the file 10, said device is moved by hand back and forth across said lawn mower until the knife is made sharp. The knife, which is one of the revolving knives, will automatically turn back and forth as the device is moved lengthwise of the cutting plate P and of the knife, K, being guided by the guiding groove 8 in the member 7. When one blade is sharpened, the next one is turned into position to fit into the groove 8 and be sharpened in like manner.

As some lawn mowers have revolving cutting knives which turn in a reverse direction, it is necessary to change the guide member 7 for one having the guiding groove 8 arranged in the other diagonal position, but as this will be readily understood, it is not necessary to illustrate it.

I am aware that other changes in details can be made in my invention as here illustrated, without departing from the spirit thereof, and I do not, therefore, limit the invention to the particular form here illustrated, except as I may be limited by the hereto appended claims.

I claim:

1. In a device of the character referred to, a body having a guiding element adjustably attached thereto with means for securing it in fixed relation to the body, said guiding element being adapted to hook upon and be moved along a fixed part of the machine upon which it is to be used, whereby said device can be lifted from or applied to said machine at will, and a sharpening element attached to said body and made rigid therewith for use and positioned to engage the knife to be sharpened as said device is placed on the machine, said device being adapted to be placed upon the machine and operated as a rigid unit and to be lifted therefrom at will.

2. A device of the character referred to comprising a flat bar bent to substantially a right angle and provided with a slot in one wing of the angle, a guiding member adjustably secured thereto with means for holding it rigid therewith, said guiding member being adapted to slide along a fixed bar, and a sharpening element rigidly secured to the other part of said flat bar, for the purpose referred to.

3. A sharpening device for lawn mowers, comprising a flat bar bent to form a right angle and provided with a slot extending longitudinally thereof, a holding member secured thereto, means operating through said flat bar for securing a sharpening element in said holding member, a sharpening element to be held securely therein, and a guiding member adjustably secured to said flat bar and adapted to slide along a fixed part of a lawn mower with said sharpening element in engagement with the knife of said lawn mower, for the purpose referred to.

4. A sharpening device for lawn mowers comprising a flat bar bent to form a right angle and provided at one end with a guiding member adjustably secured thereto and held rigid therewith to slide back and forth along a fixed bar of a lawn mower, and at its opposite end provided with a holding member, adapted to fit over the edge of a knife of a lawn mower, a sharpening element in said holding member, and a set screw through said flat bar for holding said sharpening element securely in said holding member whereby the opposite side of said sharpening element engages the knife of said lawn mower, substantially as described.

5. In a device of the character referred to, a holding bar provided with guiding means, and means for holding a sharpening element comprising a member having therein a receiving pocket and a transverse opening to receive the edge of a knife to be sharpened, a sharpening element in said receiving pocket and forming the bottom of said transverse opening, whereby a knife inserted in said transverse opening engages with the sharpening element, and means for holding said sharpening element in place, said means being a set screw against the opposite side of said sharpening element.

Signed at Los Angeles, in the county of Los Angeles, and State of California, this 8th day of September, 1919.

JOSEF PALAS.

In presence of—
W. R. LITZENBERG,
H. M. BRUNDAGE.